US012693160B2

(12) United States Patent
This et al.

(10) Patent No.: US 12,693,160 B2
(45) Date of Patent: Jul. 28, 2026

(54) METHOD FOR THE ENERGY CALIBRATION OF A SPECTROMETRY DETECTOR

(71) Applicants: COMMISSARIAT A L'ENERGIE ATOMIQUE ET AUX ENERGIES ALTERNATIVES, Paris (FR); CENTRALESUPELEC, Gif-sur-Yvette (FR); CENTRE NATIONAL DE LA RECHERCHE SCIENTIFIQUE, Paris (FR); UNIVERSITE PARIS-SACLAY, Gif-sur-Yvette (FR)

(72) Inventors: Kélian This, Is sur Tille (FR); Adrien Frigerio, Is sur Tille (FR); Sébastien Colas, Is sur Tille (FR); Laurent Le Brusquet, Gif sur Yvette (FR)

(73) Assignees: COMMISSARIAT A L'ENERGIE ATOMIQUE ET AUX ENERGIES ALTERNATIVES, Paris (FR); CENTRALESUPELEC, Gif-sur-yvette (FR); CENTRE NATIONAL DE LA RECHERCHE SCIENTIFIQUE, Paris (FR); UNIVERSITE PARIS-SACLAY, Gif-sur-Yvette (FR)

( * ) Notice: Subject to any disclaimer, the term of this patent is extended or adjusted under 35 U.S.C. 154(b) by 229 days.

(21) Appl. No.: 18/724,707

(22) PCT Filed: Dec. 29, 2022

(86) PCT No.: PCT/EP2022/088055
§ 371 (c)(1),
(2) Date: Jun. 27, 2024

(87) PCT Pub. No.: WO2023/126509
PCT Pub. Date: Jul. 6, 2023

(65) Prior Publication Data
US 2025/0067597 A1 Feb. 27, 2025

(30) Foreign Application Priority Data

Dec. 30, 2021 (FR) ...................................... 2114708

(51) Int. Cl.
*G01J 3/28* (2006.01)

(52) U.S. Cl.
CPC ......... *G01J 3/28* (2013.01); *G01J 2003/2836* (2013.01); *G01J 2003/2859* (2013.01); *G01J 2003/2866* (2013.01)

(58) Field of Classification Search
None
See application file for complete search history.

(56) References Cited

U.S. PATENT DOCUMENTS 10,203,246 B2 * 2/2019 Rosen ................... G01J 3/0275
2007/0136017 A1 * 6/2007 Wang ................. H01J 49/0027
702/85

(Continued)

FOREIGN PATENT DOCUMENTS

EP 3 674 753 A1 7/2020

OTHER PUBLICATIONS

International Search Report and Written Opinion issued on Mar. 29, 2023 in PCT/EP2022/088055 filed on Dec. 29, 2022 (with English translation of International Search Report), 15 pages.

*Primary Examiner* — Marcus H Taningco
(74) *Attorney, Agent, or Firm* — Oblon, McClelland, Maier & Neustadt, L.L.P.

(57) ABSTRACT

The invention is a method for processing a calibration spectrum acquired by a spectrometric detector of X or gamma photons. The method comprises a taking into account of a parametric form of a calibration function, the calibration function linking the rank of an energy channel to an energy value. The method comprises a confrontation between the channels of the peaks of the calibration spec- (Continued)

trum and emission energies of calibration isotopes. The confrontation makes it possible to define the values of the parameters of the calibration function.

11 Claims, 13 Drawing Sheets

(56) References Cited

U.S. PATENT DOCUMENTS

2011/0012012 A1\* 1/2011 Stein ......................... G01T 1/17
                                                    250/252.1
2011/0108718 A1\* 5/2011 Jones ...................... G01T 1/178
                                                    250/252.1
2020/0379133 A1    12/2020 Burr et al.

\* cited by examiner

METHOD FOR THE ENERGY CALIBRATION OF A SPECTROMETRY DETECTOR

TECHNICAL FIELD

The technical field of the invention is the spectrometry applied to the detection of radiations.

PRIOR ART

The devices for detecting ionizing radiation, based on gaseous detection materials, semiconductors or scintillators, make it possible to obtain electrical pulses formed by interactions of the radiation in the detection material. The amplitude of each pulse depends on the energy deposited by the radiation during each interaction. These devices are usually coupled to spectrometric measurement circuits. Such devices make it possible to obtain a spectrum, which corresponds to a histogram of the amplitudes detected during a period of exposure. The spectrum is established according to different amplitude channels, usually several hundreds or several thousands of channels. Each channel has a corresponding narrow amplitude band. Each channel is assigned a value, corresponding to a number of pulses, detected during the period of exposure, the amplitude of which is situated in the amplitude band corresponding to the channel.

The spectrometric measurement systems are now widely industrialized. The fields of application are wide, and notably include measurements of nuclear waste, equipment or installations, or the radiological monitoring of the environment. Software makes it possible to parameterize the processing of the pulses, and the driving and the automated interpretation of measurements.

However, some steps are difficult and still leave a wide space for manual settings. Such is the case for example with energy calibration, which makes it possible to establish a relationship between the amplitude of a pulse and the energy released by the interaction having given rise to the pulse. The relationship between the amplitude and the energy depends on the detector used, and on the parameterizings of the spectrometric measurement circuit, for example the amplification gain, pulse shaping parameters or the number of channels. Furthermore, for a same device, without modification of the settings, the relationship between the amplitude and the energy can be subject to drifts, which necessitates a periodic calibration.

The energy calibration is usually performed by exposing a detector to a calibration object whose emission energies are known. The calibration object can notably comprise one or more isotopes whose emission energies are known. The calibration consists in acquiring a spectrum of the photons emitted by the isotopes, then identifying the main peaks present in the spectrum. A part of the peaks detected corresponds to a known emission energy. Each detected peak extends on either side of a central channel. The energy calibration makes it possible to determine different channel (i.e. the central channel of a peak)-emission energy pairings. From these different pairings, an analytical function, called calibration function, linking the rank of each channel to an energy, is determined.

The energy calibration is a frequent operation, which must be performed accurately, in order not to falsify the interpretation of measurements. The invention described hereinbelow facilitates the automation and the repeatability of energy calibration. It can also make it possible to maximize the number of peaks taken into account to determine the calibration function.

SUMMARY OF THE INVENTION

A first subject of the invention is a method for processing a calibration spectrum, formed by a spectrometric measurement device, the device comprising:
- a detector, configured to detect particles, and to form, on each detection, a pulse whose amplitude depends on an energy of a particle having interacted in the detector;
- a spectrometric measurement circuit, configured to form a spectrum, the spectrum corresponding to a number of particles detected in channels, each channel being assigned a rank, each rank having a corresponding pulse amplitude;

the method comprising the following steps:
- a) arrangement of the device facing a calibration object, the calibration object emitting, to the detector, particles of different known emission energies;
- b) detection of a part of the particles by the detector and formation of a calibration spectrum of the detected particles, the spectrum comprising different peaks, each peak corresponding to a known energy;
- c) assignment of a channel rank to each detected peak;
- d) from the ranks of the channels assigned to different peaks in the step c) and the emission energies, determination of a calibration function, the calibration function determining an energy from the rank of each channel, the calibration function being a bijective function;

the method being characterized in that the step d) comprises the following substeps:
- d-i) the taking into account of an analytical model of the calibration function, the analytical model being parameterized by a set of parameters;
- d-ii) for different values of each parameter:
- application of the calibration function to the rank of each channel assigned to each detected peak, so as to obtain, for each rank, an energy determined by the calibration function;
- or application of the function that is the reciprocal of the calibration function to each emission energy, so as to obtain, for each emission energy, a channel determined by the reciprocal function;
- d-iii) determination of the value of each parameter for which:
- the energies determined in d-ii) are the closest to the emission energies of the calibration object;
- the channels determined in d-ii) are the closest to the channels assigned to each detected peak.

According to one embodiment, the substep d-iii) can comprise:
- calculation of a function of likelihood of the value of each parameter;
- estimation of the value of each parameter maximizing the likelihood function.

The step c) can comprise a determination of a width of each peak. The likelihood function can then take into account the width of each peak.

The substep d-iii) can comprise:
- the taking into account of different pairings, each pairing comprising an emission energy and a channel assigned to a peak, following the step c);

determination of the value of each parameter for which the calibration function makes it possible to link several pairings, each determined value forming an initial value of each parameter;

for each initial value, definition of a search area extending around said initial value, such that the value of each parameter maximizing the likelihood function is estimated in the search areas defined around the initial values of said parameter.

The substep d-iii) is preferentially implemented by an optimization algorithm. According to one possibility, the step c) comprises a selection of the peaks of the calibration spectrum as a function of a criterion of selection of the peak. The selection criterion can be a number of photons detected in each peak or a signal-to-noise ratio determined for each peak.

The substep d-iii) can include a taking into account of an a-priori concerning the value of at least one parameter to determine the value of said parameter.

The particles can be chosen from among: photons, neutrons, charged particles.

A second subject of the invention is a device intended to acquire a spectrum of particles emitted by an object, the device comprising:

a detector, configured to detect particles, and to form, on each detection, a pulse whose amplitude depends on an energy released by the particle having interacted in the detector;

a spectrometric measurement circuit, configured to form a spectrum, the spectrum corresponding to a distribution of the amplitudes of the pulses detected by the detector;

a processing unit, programmed to implement the step d) of a method according to the first subject of the invention based on the spectrum.

A third subject of the invention is a medium, intended to be connected to a computer, comprising instructions for the implementation of the step d) of a method according to the first subject of the invention based on a spectrum representative of the energy of particles detected. The medium can be incorporated in the computer or linked to a computer by a wired or wireless link.

A fourth subject of the invention is a method for processing a calibration spectrum formed by a spectrometric measurement device, the device comprising:

a detector, configured to detect particles, and to form, on each detection, a pulse whose amplitude depends on a mass of a particle having interacted in the detector;

a spectrometric measurement circuit, configured to form a spectrum, the spectrum corresponding to a number of particles detected in channels, each channel being assigned a rank, a pulse amplitude corresponding to each rank;

the method comprising the following steps:

a) exposure of the device to a calibration object, the calibration object comprising particles of known mass;

b) detection of all or part of the particles by the detector and formation of a calibration spectrum of the detected particles, the spectrum comprising different peaks, each peak corresponding to a known mass;

c) assignment of a channel rank to each peak;

d) from the ranks of the channels assigned to different peaks in the step c) and the known different masses, determination of a calibration function, the calibration function determining a mass from the rank of each channel, the calibration function being a bijective function;

the method being characterized in that the step d) comprises:

d-i) the taking into account of an analytical model of the calibration function, the analytical model being parameterized by a set of parameters;

d-ii) for different values of each parameter:

application of the calibration function to the rank of each channel assigned to each peak, so as to obtain, for each rank, a mass determined by the calibration function;

or application of the function that is the reciprocal of the calibration function to each mass, so as to obtain, for each mass, a channel determined by the reciprocal function;

d-iii) determination of the values of the parameters for which:

the energies determined in d-ii) are the closest to the masses of the particles of the calibration object;

the channels determined in d-ii) are the closest to the channels assigned to each peak.

The invention will be better understood on reading the explanation of the exemplary embodiments presented, hereinafter in the description, in association with the figures listed below.

FIGURES

FIG. 7C corresponds to the spectrum represented in FIGS. 7A and 7B.

FIG. 7E corresponds to the spectrum represented in FIGS. 7A and 7B.

FIG. 8B corresponds to the spectrum represented in FIG. 8A.

FIG. 8D corresponds to the spectrum represented in FIG. 8A.

EXPLANATION OF PARTICULAR EMBODIMENTS

Figure 1:
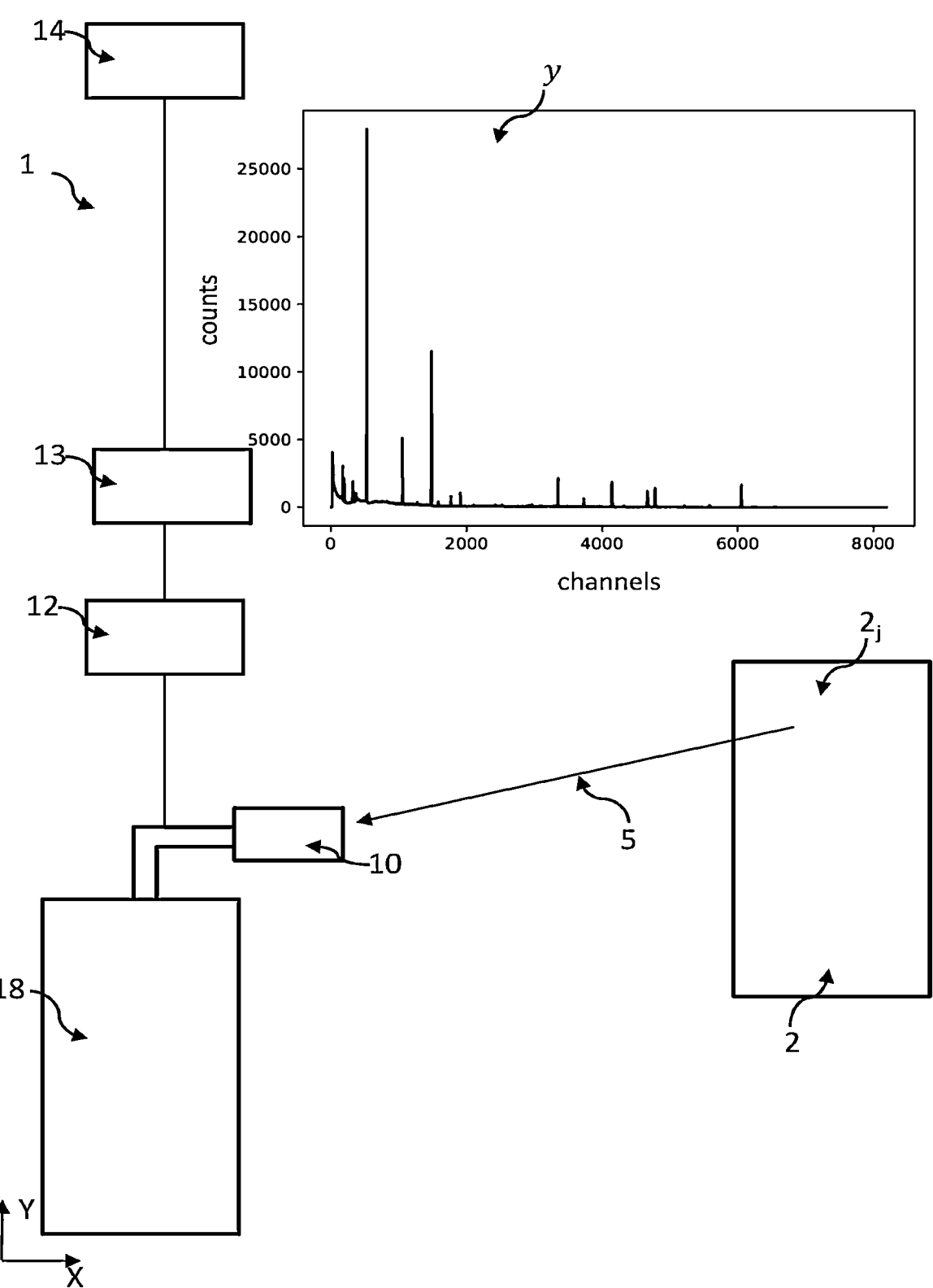
FIG. 1 represents an example of a device making it possible to implement the invention.

A device 1 is represented in FIG. 1 that makes it possible to implement the invention. The device is a measurement system, comprising a detector 10, capable of interacting with a radiation 5 emitted by an object 2. The object 2 is, here, a nuclear waste, that can include different irradiating isotopes 2_j_. Generally, the irradiating isotopes likely to be present in a measured object are previously known. It is notably possible to compile a list comprising the irradiating isotopes potentially present in the analyzed object. The index j designates each irradiating isotope.

In the example represented, the detector 10 is configured to detect an ionizing photonic radiation. An ionizing photonic radiation is understood to be a photonic radiation of X or gamma type, formed by photons whose energy for example lies between 1 keV and 2 MeV. The method according to the invention applies to the detection of other particles, for example neutrons, charged particles (for example α radiation or β-radiation), or photons.

In the example represented, the detector comprises a semiconductor material, of Germanium (Ge) type, but it could also be a semiconductor material commonly implemented for the detection of ionizing photons, for example of Si, CdTe, CdZnTe type. The photons forming the incident radiation interact with the detector material. The detector material is subjected to a bias voltage V. Each interaction generates charge carriers, which are collected by an electrode, generally an anode.

Other types of detectors, for example scintillators coupled to a photons/charge carriers converter, or a gaseous detector of ionizing chamber type, can be used, provided that they make it possible to collect a quantity of charges Q under the effect of an energy E released by the ionizing radiation during an interaction in the detector 10. The usual detectors of scintillator type that can be cited include NaI(Tl) or LaBr$_3$.

The detector 10 is linked to an electronic circuit 12, configured to generate a pulse whose amplitude depends on, and is preferably proportional to, the quantity of charge collected in an interaction. The quantity of charge corresponds to the energy deposited by the radiation during the interaction.

In the example represented, the detector 10 is linked to a cryostat 16, containing liquid nitrogen to keep the Ge detector at an operating temperature.

The electronic circuit 12 is linked to a spectrometry unit 13, arranged downstream of the electronic circuit, which makes it possible to collect together all of the pulses formed during an acquisition period. Each pulse corresponds to an interaction of the incident radiation in the detection material. The spectrometry circuit then classifies the pulses as a function of their amplitude A, to provide a histogram comprising the number of pulses detected as a function of their amplitude. This histogram is an amplitude spectrum. It is usually obtained by using a multichannel analyzer. Each amplitude is discretized according to the channels, each channel being assigned an amplitude band. The value of each channel of the spectrum corresponds to a number of pulses whose amplitude is situated within the amplitude band assigned to the channel. Each amplitude band corresponds to an energy band, the correlation being bijective. Thus, each channel is assigned an energy band or an amplitude band.

The relationship between amplitude and energy can be made by irradiating the detector using a calibration object, emitting a radiation whose energy is known. This is in particular a radiation having at least one discontinuity, or energy peak, with a known energy value. This operation is usually referred to by the term energy calibration. In the gamma spectrometry context, the detector is exposed to a calibration source of $^{152}$Eu type, producing photons with known emission energies. It is also possible to implement other isotopic sources, as described hereinbelow in one of the exemplary embodiments. It is preferable for the isotope or the isotopes to be such that photons are emitted according to at least two different emission energies. The emission energies extend between a minimum value and a maximum value. It is preferable for the difference between the minimum value and the maximum value to cover the spectral domain in which the detector is intended to be used.

The energy calibration makes it possible to establish a calibration function $f_e$, that makes it possible to establish an analytical relationship between the measured amplitude and the energy. The taking into account of the calibration function $f_e$ makes it possible, by a change of variable, to assign the value of the channels to energy values instead of amplitudes. Indeed, the amplitudes depend on the detector and on the settings made, whereas the energies correspond to set physical quantities that are independent of the detector.

The spectrum y is a histogram of the amplitudes of each pulse detected, discretized according to the energy or amplitude channels. Each channel is assigned an amplitude band which, by the application of the calibration function, becomes an energy band. The spectrum y can be expressed in the form of a vector $(y_1, \ldots y_k \ldots, y_n)$, in which n corresponds to the total number of channels. Each channel is assigned a rank k, with $1 \leq k \leq n$. Each channel of rank k is delimited by a lower amplitude $A_k$ and an upper amplitude $A_{k+1}$, such that a detected pulse is assigned to the channel of rank k when its amplitude lies between $A_k$ and $A_{k+1}$.

The lower amplitude $A_k$ of each channel corresponds to a lower energy $e_k$. The upper amplitude $A_{k+1}$ of each channel corresponds to a higher energy $e_{k+1}$. The amplitude-energy correlation is established by the calibration function $f_e$ described in association with the prior art. Thus, $$e_k = f_e\left(\frac{k-1}{n}, \beta\right) \tag{1}$$

and $$e_{k+1} = f_e\left(\frac{k}{n}, \beta\right) \tag{2}$$

$\beta$ is a set of parameters of the function $f_e$, described hereinbelow.

The quantity $$\frac{k-1/2}{n}$$

corresponds to a position of the centre of a channel of rank k relative to the number n of channels of the spectrum. This is a standardized rank of each channel, lying between 1 (k=1) and (k=n). The standardization makes it possible to establish a calibration function that is independent of the number of channels n, the latter being able to be parameterized.

Figures 3, 4:
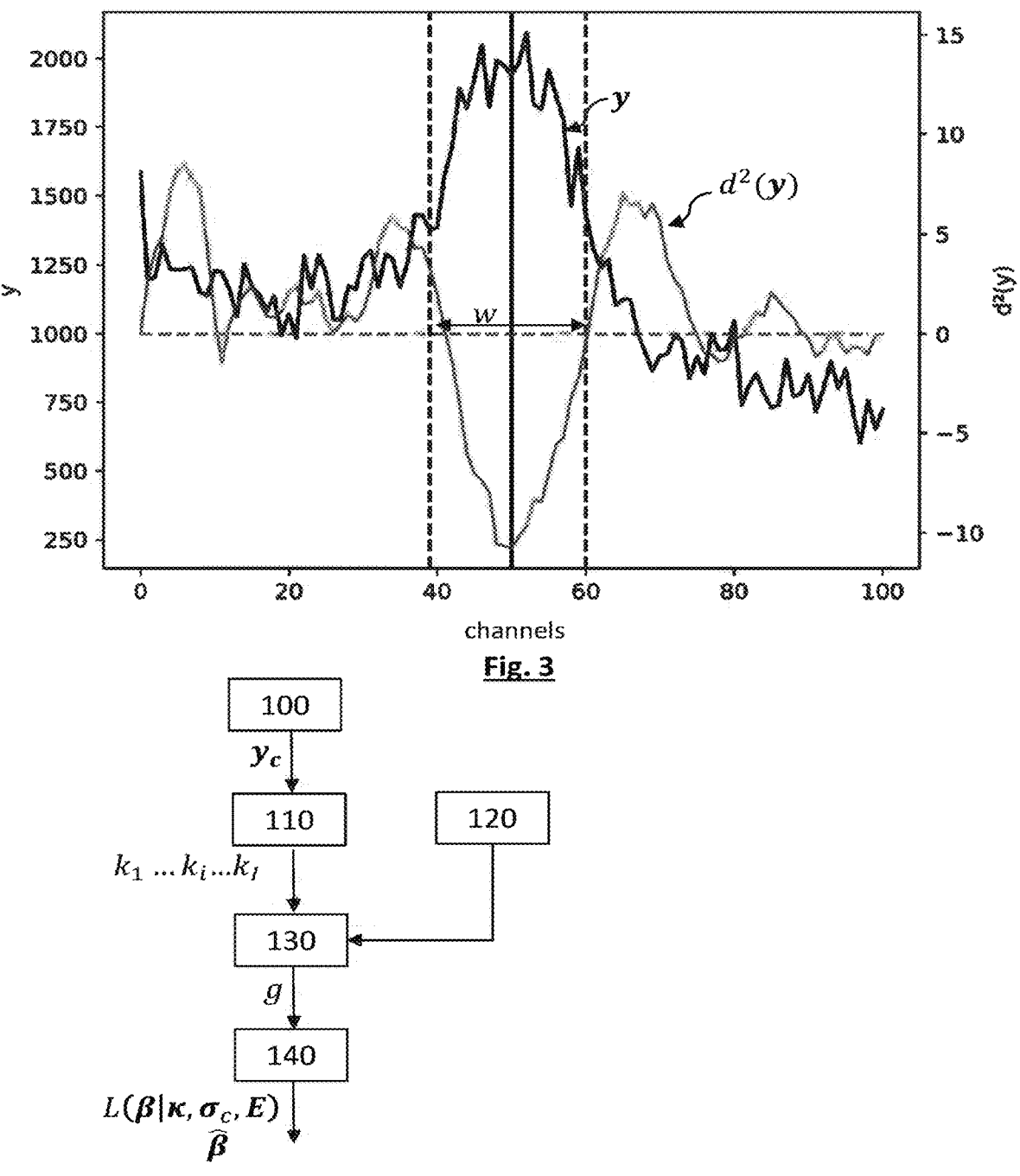
FIG. 3 shows a peak of a spectrum and the application of a second-order linear differential operator to the spectrum.
FIG. 4 shows the main steps of an embodiment of a method according to the invention.

The device comprises a processing unit 14, programmed to implement steps of the algorithm described in association with FIG. 4. The processing unit 14 is linked to the spectrometry unit 13, from which it receives each measured spectrum.

Figures 2A, 2B:
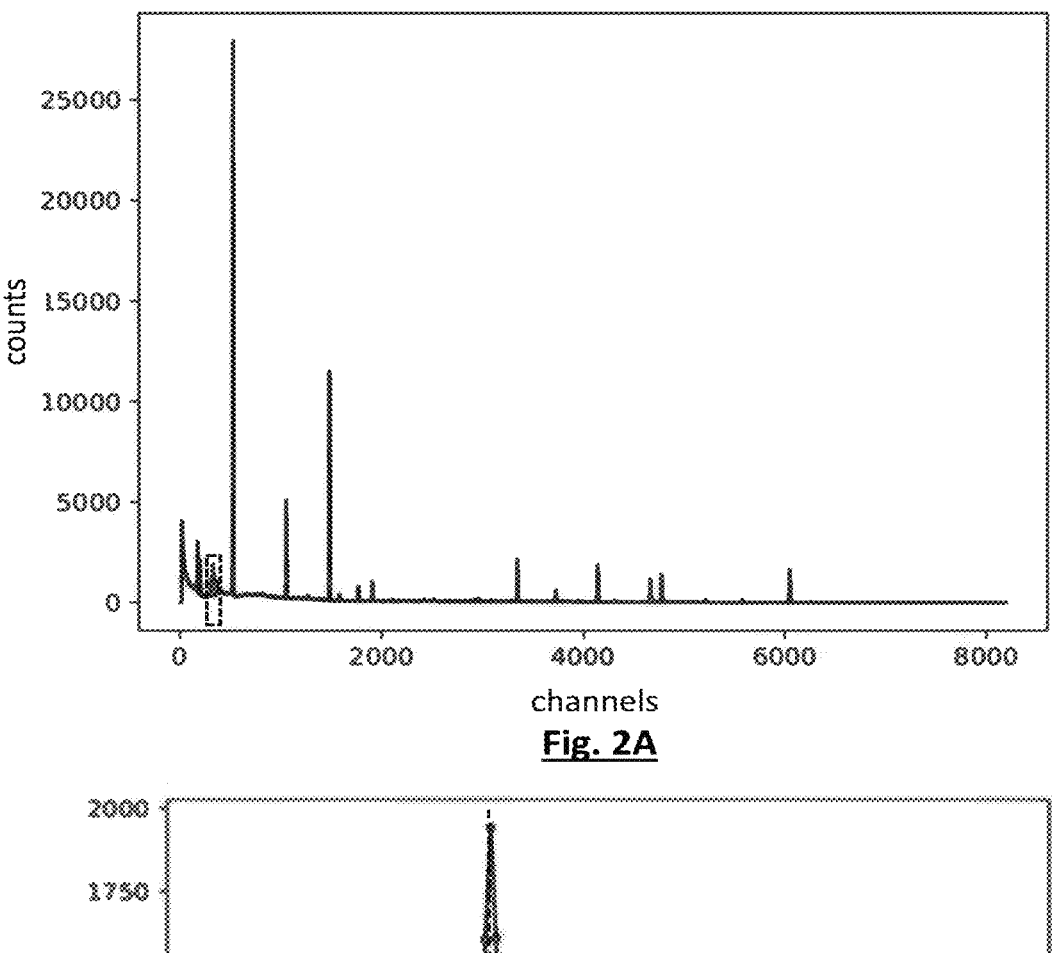
FIG. 2A represents an example of a spectrum.
FIG. 2B is a detail of FIG. 2A.

The objective of a measurement by gamma spectrometry is to identify the isotopes $2_j$ present in the object 2 and, preferably, to estimate their respective activities. FIG. 2A represents a spectrum y resulting from a Germanium detector, exposed to a source including the isotope $^{152}$Eu. The X axis corresponds to the channels and the Y axis corresponds to the number of pulses whose amplitude corresponds to each channel. FIG. 2B is a detail of FIG. 2A, corresponding to the rectangular zone drawn in FIG. 2A.

The spectrum y represented comprises several peaks, each peak corresponding to an emission energy of an isotope present in the object 2. These peaks form the useful information of each spectrum, from which it is possible to identify the isotopes and quantify their respective activities. The spectrum also includes a continuum, corresponding to scatterings of photons in the detector or before reaching the detector. The continuum corresponds to the part of the spectrum under and between each peak. The spectrum also comprises a background noise component, reflected by statistical fluctuations.

One of the routine steps of spectrum processing is the detection of each peak. In FIG. 2B, different peaks have been represented. The X axis corresponds to the amplitude channels while the Y axis corresponds to the number of pulses detected in each channel. The processing unit can then determine a channel characteristic of each peak, for example the central channel around which the peak is centered. The central channel is usually the channel comprising the greatest number of pulses detected.

Each peak is delimited by two channels, respectively constituting the lower $inf_i$ and upper $sup_i$ bounds of each peak. Consequently, each peak is assigned to an order i, in ascending order of amplitude. Each peak of order i is identified by the channel of rank $k_i$ of its central channel, the latter being arranged between the lower bound $inf_i$ and the upper bound $sup_i$ of the peak.

According to one possibility, it is possible to manually delimit each peak. The detection and the delimitation of each peak can also be done automatically, by implementing for example a second-order differentiation operator, denoted $d^2$. FIG. 3 represents a part of a spectrum y corresponding to a peak. In FIG. 3, a second-order differentiation operator has also been represented, applied to the spectrum y, denoted $d^2(y)$. The vertical line, which corresponds to a local minimum of $d^2(y)$, makes it possible to identify the channel of rank k corresponding to the center of the peak. The differentiation operator can be a third-order Savitzky or Golay filter of window width 11.

FIG. 4 schematically represents the main steps of a method for determining a calibration function, these steps being described hereinbelow.

Step 100: acquisition of the calibration spectrum y. During this step, the detector is exposed to a calibration object. The calibration object generally comprises one or more calibration isotopes whose emission energies are known.

Step 110: detection of the peaks of the calibration spectrum and assignment of a channel to each detected peak. $k_1 \ldots k_i \ldots k_I$ are used to denote the ranks of the channels assigned to each peak detected on the calibration spectrum.

I designates the number of peaks detected on the calibration spectrum y, which correspond respectively to emission energies $E'_1 \ldots E'_j \ldots E'_J$ of the calibration isotopes.

Each peak of the calibration spectrum y extends according to a full width at bucket$w_i$. An example of full width at half maximum is represented in FIG. 2B.

The full width at half maximum is also determined in the detection of the peaks by usual means. For example, when the detection of the peaks is performed by applying a Savitzky and Golay filter as described in association with FIG. 3, the full width at half maximum of each peak can be estimated by determining the number of channels between two zero crossings of the function $d^2(y)$ on either side of the local minimum corresponding to the peak. FIG. 3 shows a full width at half maximum w. The full width at half maximum can be determined by other usual spectrometry software means, following a manual delimitation of the peaks.

Step 120: taking into account of an analytical model of the calibration function $f_e$. During this step, an analytical model of the calibration function is defined, for example a linear function or a polynomial of predetermined degree. The model is parameterized by a set of parameters $\beta$.

It is assumed that each energy $E_i$ corresponding to a detected peak is situated at the center of the channel of rank $k_i$ which collects together the pulses of energies lying between $e_i$ and $e_{i+1}$. Thus, it is assumed that $$E_i = \frac{e_i + e_{i+1}}{2}. \tag{3}$$

Given (1), (2), and (3)

$$E_i = f_e\left(\frac{\frac{k_i + k_i - 1}{2}}{n}, \beta\right) = f_e\left(\frac{k_i - \frac{1}{2}}{n}, \beta\right). \tag{4}$$

in which:
  n corresponds to the total number of channels of the spectrum.
  $k_i$ and $k_i+1$ are the respectively minimum and maximum amplitudes of the amplitude channel of rank i corresponding to the energy $E_i$.

$$k_i - \frac{1}{2}$$

corresponds to a median amplitude of the channel of rank i, which is assumed to correspond to the emission energy $E_i$.

The calibration function can be linear, in which case the set of parameters is $\beta=(\beta_0; \beta_1)$ and:

$$E_i = \beta_0 + \beta_1\left(\frac{k_i - \frac{1}{2}}{n}\right) \tag{5}$$

In the case of a second-order polynomial, the calibration function is of type:

$$E_i = \beta_0 + \beta_1\left(\frac{k_i - \frac{1}{2}}{n}\right) + \beta_2\left(\frac{k_i - \frac{1}{2}}{n}\right)^2. \tag{5'}$$

The set of the parameters is $\beta=(\beta_0; \beta_1; \beta_2)$.

The calibration function $f_e$ is necessarily bijective. Usually, the channels are classified according to increasing amplitudes, in which case the calibration function is an increasing function.

$E_i$ represents the energy corresponding to the median amplitude of the channel of rank $k_i$, by the application of the calibration function $f_e$. Thus, the calibration function $f_e$ makes an energy $E_i$ correspond to each channel of rank $k_i$.

The calibration object emits photons with emission energies $E'_1 \ldots E'_j \ldots E'_J$. J corresponds to the number of emission energies. All the peaks, corresponding to emission energies, may not be detected by the detection of peaks, for example if the quantity of photons in a peak is too small. The ranks $k_1 \ldots k_i \ldots k_I$ corresponding to certain detected peaks correspond to certain emission energies $E'_1 \ldots E'_j \ldots E'_J$.

Figure 5:
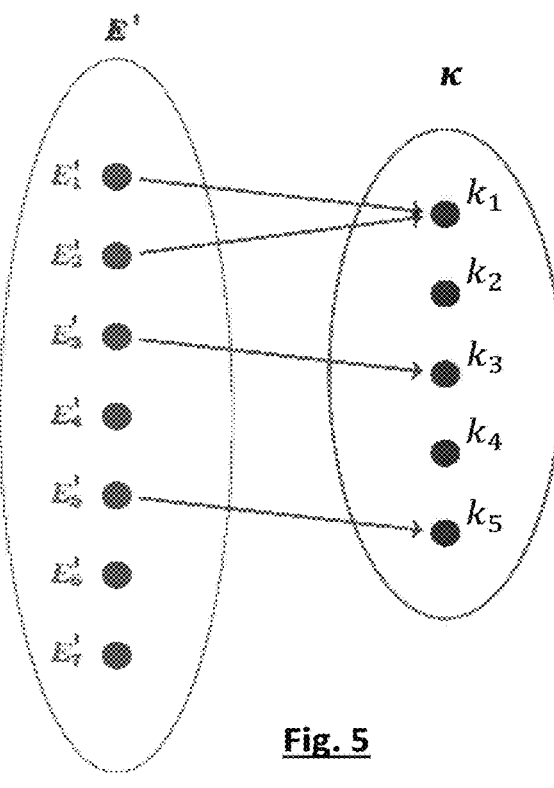
FIG. 5 illustrates correlations between emission energies and central channels of detection peaks.

FIG. 5 represents an example of channels $k_1 \ldots k_i \ldots k_I$ (I=5) corresponding to each detected peak taken in ascending order ($k_i > k_{i-1}$), and the emission energies $E'_1 \ldots E'_j \ldots E'_J$ of the isotopes, also taken in ascending order ($E'_j > E'_{j+1}$) (J=7). The calibration function should maximize the number of occurrences according to which $$E'_j = f_e\left(\frac{k_i - \frac{1}{2}}{n}, \beta\right).$$

In FIG. 5, each occurrence is represented by an arrow. When two emission energies are close together, they can be associated with a channel of the same rank. In FIG. 5, this particular case is illustrated by the energies $E_1$ and $E_2$.

Step 130: Establishment of a Probability Density

Each emission energy $E_1 \ldots E_j \ldots E_J$ has a corresponding channel of rank $x_1 \ldots x_j \ldots x_J$ by the application of the function $f_e^{-1}$, such that $$x_j = n f_e^{-1}(E'_j, \beta) + \frac{1}{2} \tag{6}$$

The notation $f_e^{-1}(E'_j, \beta)$ designates the fact that $f_e^{-1}$ depends on $\beta$.

As previously indicated, a detected peak has a certain spectral width $w_i$, inducing an uncertainty concerning the rank of the channel $k_i$. It can be considered that, for each emission energy $E'_j$, the rank $k_i$ of the channel in which the peak is detected is a variable according to a predetermined probability density g, for example Gaussian, such that:

$$g(k_i \mid x_j, \sigma_i) = \frac{1}{\sigma_i \sqrt{2\pi}} \exp\left(-\frac{1}{2}\left(\frac{x_j - k_i}{\sigma_i}\right)^2\right) \tag{7}$$

in which:

$x_j$ is the "true" rank of the channel associated with the peak of emission energy $E_j$;

$k_i$ is the rank assigned to the $i^{th}$ peak detected;

$$\sigma_i = \frac{w_i}{2}.$$

10

Starting from (7), it is possible to write:

$$g(\kappa \mid x, \sigma) = \sum_{i=1}^{I}\sum_{j=1}^{J} g(k_i \mid x_j) P(i, j) \tag{8}$$

in which:

$\kappa$ is a vector comprising all of the ranks of the channels corresponding to detected peaks: $\kappa = k_1 \ldots k_i \ldots k_I$ $P(i, j)$ is a probability that a peak of rank $k_i$ corresponds to an emission energy $E'_j$;

$\sigma$ is the vector $(\sigma_1 \ldots \sigma_i \ldots \sigma_I)$.

All the combinations $k_i$, $E'_j$ are considered to be equally probable. Thus, $$P(i, j) = \frac{1}{IJ} \tag{9}$$

Step 140: Establishment of a Likelihood and Maximization Function

By taking into account (7), (8), and (9), it is possible to write:

$$g(\kappa \mid E', \sigma, \beta) = \sum_{i=1}^{I}\sum_{j=1}^{J} \frac{1}{\sigma_i \sqrt{2\pi} IJ} \exp\left(-\frac{1}{2}\left(\frac{n f_e^{-1}(E'_j, \beta) + \frac{1}{2} - k_i}{\sigma_i}\right)^2\right) \tag{10}$$

Deduced therefrom is a likelihood function of $\beta$, denoted $L(\beta \mid \kappa, \sigma, E')$ such that:

$$L(\beta \mid \kappa, \sigma, E') = g(\kappa \mid E', \sigma, \beta) \tag{11}$$

E' corresponds to the emission energies of the radionucleides used for the calibration: $E' = E'_1 \ldots E'_j \ldots E'_J$.

The vector of parameters $\hat{\beta}$ which maximizes the likelihood function can be estimated:

$$\hat{\beta} = \underset{\beta}{\operatorname{argmax}}\, L(\beta \mid E', \kappa, \sigma) \tag{12}$$

$$\hat{\beta} = \underset{\beta}{\operatorname{argmax}}\left[\sum_{i=1}^{I}\sum_{j=1}^{J} \frac{1}{\sigma_i \sqrt{2\pi} IJ} \exp\left(-\frac{1}{2}\left(\frac{n f_e^{-1}(E'_j, \beta) + \frac{1}{2} - k_i}{\sigma_i}\right)^2\right)\right] \tag{13}$$

The vector $\hat{\beta}$ is that for which the number of correlations between E' and $\kappa$ is maximized. That amounts to obtaining a maximum of occurrences according to which $E'_j = f_e(k_i, \hat{\beta})$.

The vector $\hat{\beta}$ thus obtained makes it possible to define the calibration function $f_e$.

Figure 6:
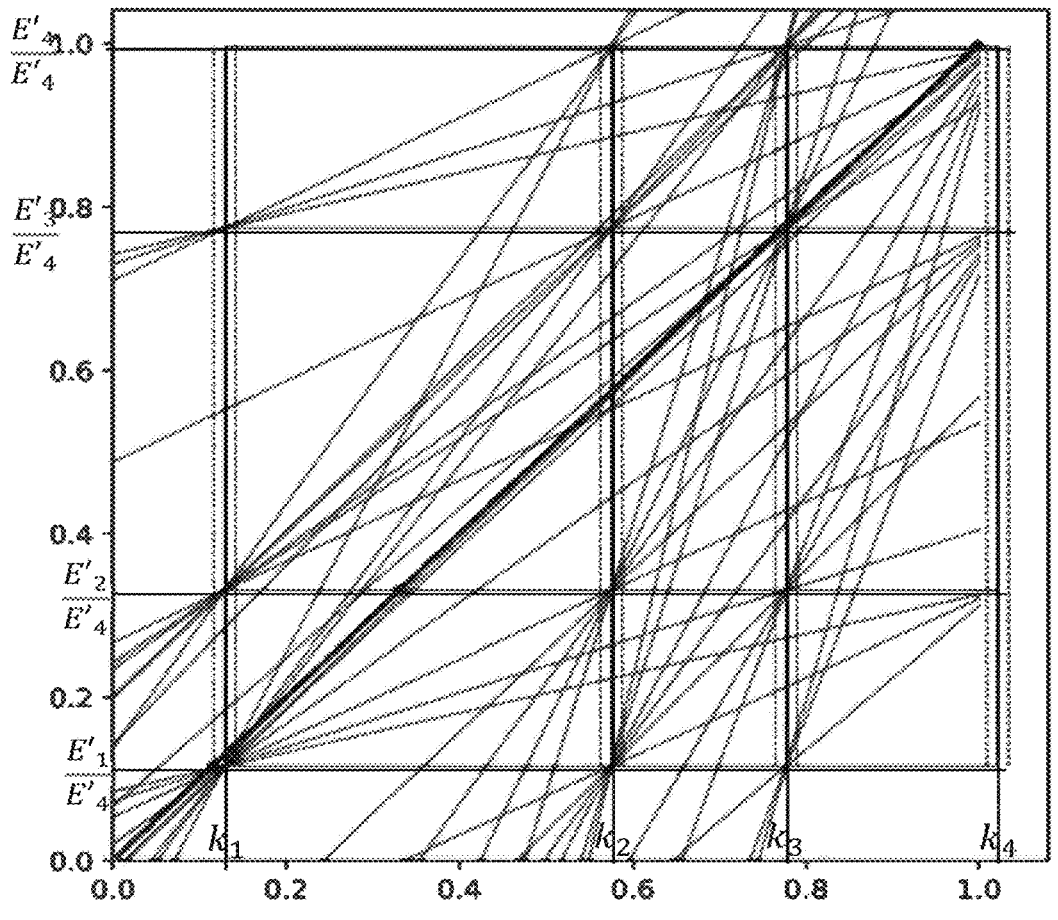
FIG. 6 illustrates correlations between central channels of detection peaks (X axis) and emission energies (Y axis).

FIG. 6 illustrates a situation according to which the function $f_e$ is linear. The function $f_e$ is such that:

$$f_e(k) = \beta_0 + \beta_1 \frac{k - \frac{1}{2}}{n} \tag{14}$$

for each channel of rank k.

11

Reciprocally, an energy $E_k$ corresponds to a channel of rank k such that:

$$\frac{k - \frac{1}{2}}{n} = f_e^{-1}(E_k) = \frac{E_k - \beta_0}{\beta_1} \quad (15)$$

The expression (13) becomes:

$$\hat{\beta} = \underset{\beta_0, \beta_1}{\mathrm{argmax}} \left[ \sum_{i=1}^{I} \sum_{j=1}^{J} \frac{1}{\sigma_i \sqrt{2\pi} \, IJ} \exp\left( -\frac{1}{2\sigma_i^2} \left( \frac{n(E_j' - \beta_0)}{\beta_1} + \frac{1}{2} - k_i \right)^2 \right) \right] \quad (16)$$

The optimization algorithm, expressed by (16), can advantageously be implemented around predetermined values of $\beta_0$ and $\beta_1$. That makes it possible to apply the maximization algorithm within a predetermined search area around the predetermined initial values of $\beta_0$ and $\beta_1$. That makes it possible to avoid "optimization traps", corresponding to the determination of local maxima of $\beta_0$ and $\beta_1$. That also makes it possible to optimize the computation time. The search area is defined around each pairing of values $\beta_0$ and $\beta_1$.

Generally, whatever the type of calibration function, the vector $\hat{\beta}$ is advantageously determined by applying an optimization algorithm, making it possible to resolve (16), on the basis of a restricted search area around discrete initial values of the vector $\hat{\beta}$. The search area corresponds to a continuous interval extending around each initial value.

The definition of the restricted search area is described hereinbelow, in association with FIG. 6.

In FIG. 6, the X axis corresponds to the standardized rank k/n of each channel. The Y axis corresponds to the emission energies $E_j'$ standardized by the highest emission energy $E_{j,max}'$ with $E_{j,max}' = E_4'$. An emission energy is detected when a channel is assigned to it.

The channels $k_i$ having been identified by the search for peaks on the calibration spectrum have been represented by black vertical lines. As indicated previously, the energy channels are assigned an uncertainty $w_i$, which is embodied by two thin vertical lines on either side of a black vertical line. The standardized emission energies $$\frac{E_j'}{E_{j,max}'}$$

correspond to horizontal lines. These are exact values, with no associated uncertainty.

Straight lines have been plotted, in gray, which pass through at least two intersections between a standardized emission energy $$\frac{E_j'}{E_{j,max}'}$$

and a detection channel $k_i$, by taking into account the associated uncertainty. Each intersection corresponds to a correlation

12

$$\frac{E_j'}{E_{j,max}'}, k_i.$$

The fact that the calibration function is necessarily increasing when the ranks of the channels are ordered in ascending manner with the amplitude has been taken into account. Thus, only the straight lines that can correspond to an increasing function ($\beta_1 > 0$) have been represented. The straight line represented in black is the straight line showing the maximum number of intersections, in this case $$(E_1', k_1), (E_3', k_3), (E_4', k_4).$$

FIG. 6 illustrates the definition of a restricted search area for implementing the optimization algorithm previously described. It involves determining initial values of the parameters of the calibration function for which the application of the bijective calibration function generates occurrences between $$E_j'\left( \text{or } \frac{E_j'}{E_{j,max}'} \right)$$

and $f_e(k_i)$ or, reciprocally, between $k_i$ and $f_e^{-1}(E_j')$. In other words, different pairings are formed, each pairing comprising an emission energy and the rank of a channel assigned to a detected peak. The optimization algorithm described in (16) is implemented around initial values of the vector of parameters $\hat{\beta}$ of the calibration function for which the calibration function is the function that bears out $E_j' = f_e(k_i)$ for at least two pairings whose respective energies and ranks are different from one pairing to the other: in other words, for two pairings $(E_j'; k_i)$ and $(E_{j'}'; k_{i'})$, $E_j' \neq E_{j'}'$ and $k_i \neq k_{i'}$.

From FIG. 6, it is possible to establish different initial values of $\beta_0$ and $\beta_1$ with:

$$\beta_1 = n \frac{E_j' - E_{j'}'}{k_i - k_{i'}} \quad (17)$$

and $$\beta_0 = E_{j'}' - \beta_1 \frac{E_j' - 1}{n} \quad (18)$$

According to a variant, the steps 130 and 140 are implemented by selecting the most intense emission energies $E_j'$ and/or the channels $k_i$ for which the surfaces of the peaks are the highest, or have a signal-to-noise ratio considered to be high. That makes it possible to optimize the computation time. According to this variant, the number of emission energies and of channels can be limited to a few tens. It is for example possible to take I=30 and J=20. More generally, the method comprises a taking into account of a criterion of selection of each peak. The peaks processed in the steps 130 and 140 are those which satisfy the selection criterion.

According to a variant, in the step 140, an a priori concerning the values of one or more parameters forming the set $\beta$ is taken into account. For example, a variation range is defined for one or more parameters. Each parameter for which an a priori is taken into account is required to be situated within the predefined variation range. The taking into account of an a priori makes it possible to avoid having the optimization algorithm generate unrealistic parameter values. The a priori constitutes a constraint for the implementation of the optimization algorithm, added to the condition according to which the calibration function is monotonic.

Experimental Tests

The inventors have implemented the calibration method as previously described by using two types of detectors: a detector of Ge (Germanium) type, as schematically represented in FIG. 1, and a detector of LaBr$_3$ (Lanthanum Bromide) type. The results of the calibrations are now reported.

During a first series of tests, an energy calibration of the Germanium detector was performed. A standard source of $^{152}$Eu, of activity 35.04 KBq, was used. A calibration spectrum was acquired during a period of 3 hours. The source was placed at a distance of 40 cm from the detector. The spectrum was acquired according to 8192 channels. The calibration function was considered linear.

Figure 7A:
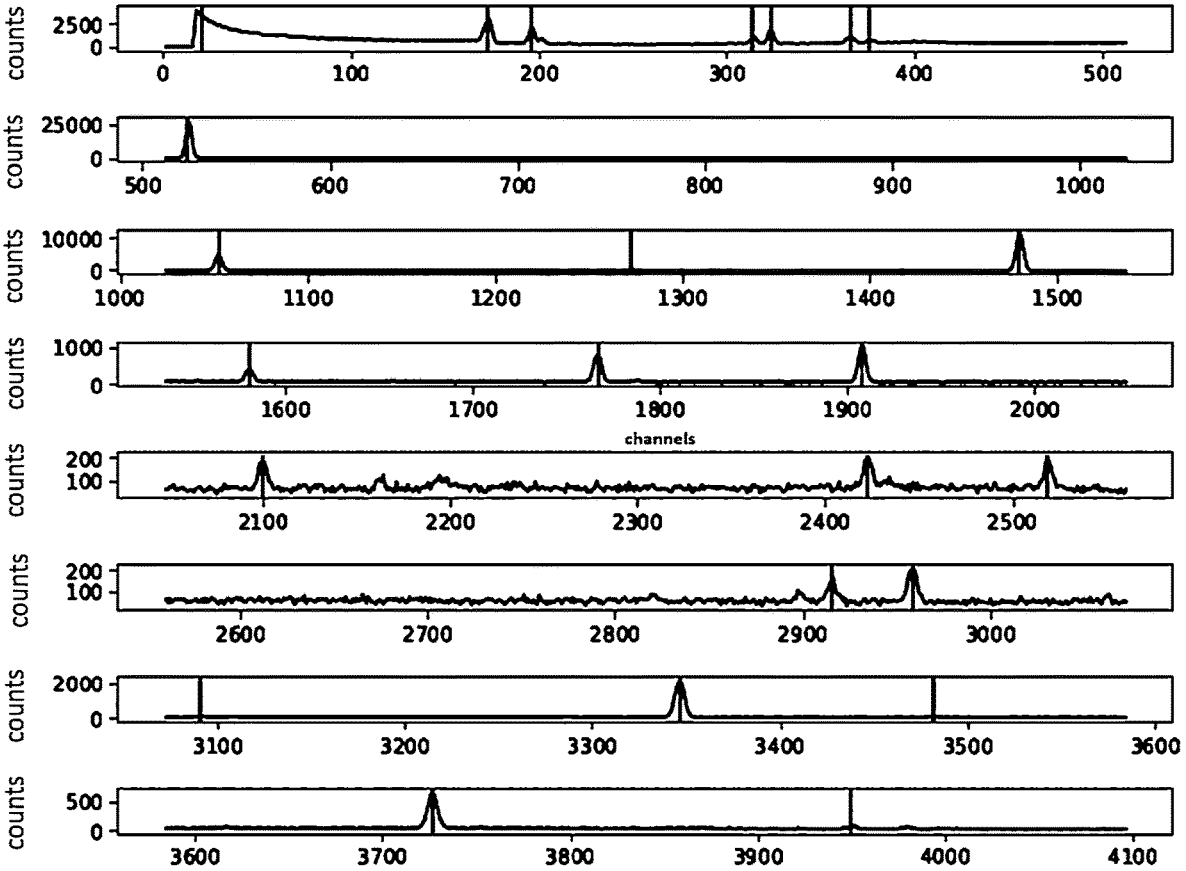
FIGS. 7A and 7B illustrate a calibration spectrum acquired with a Germanium detector. Also represented is the position of channels assigned to different detected peaks.
Figure 7B:
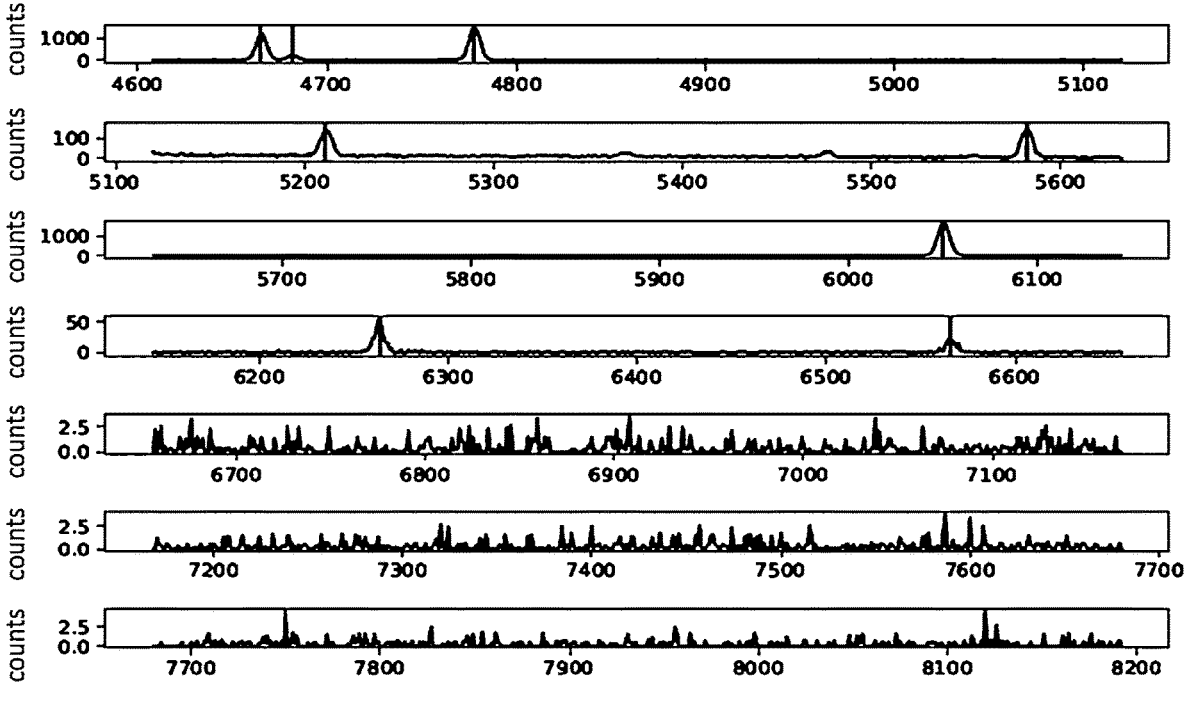

FIGS. 7A and 7B represent the channels resulting from the peak detection algorithm. It can be seen that there is no peak detected beyond the channel of rank 6600. In FIGS. 7A and 7B, the X axis corresponds to the channels and the Y axis to the number of pulses (or counts) detected and assigned to each channel. This is a conventional spectral representation.

The detection of the peaks made it possible to obtain 179700 pairings of possible channel correlations of a detected peak-emission energy. By taking into account the fact that the calibration function is increasing, 82650 possible pairings are obtained. That corresponds to J=20 (number of emission energies considered) and I=30 (number of peaks detected), the number N$_{pairings}$ of possible pairings, corresponding to an increasing calibration function, is equal to:

$$N_{pairings} = \frac{IJ(IJ - I - J + 1)}{4}. \quad (19)$$

Figure 7C:
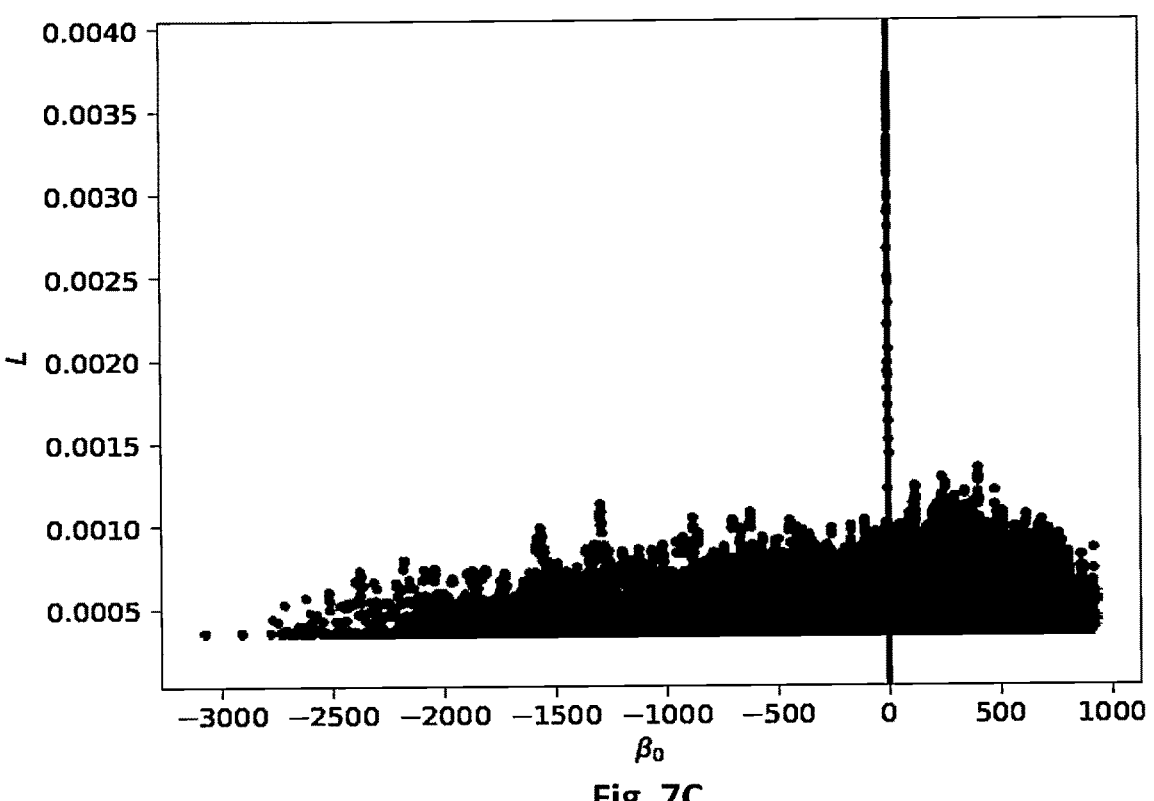
FIG. 7C shows the value of a likelihood function of a parameter of the calibration function for different values of said parameter.
Figure 7D:
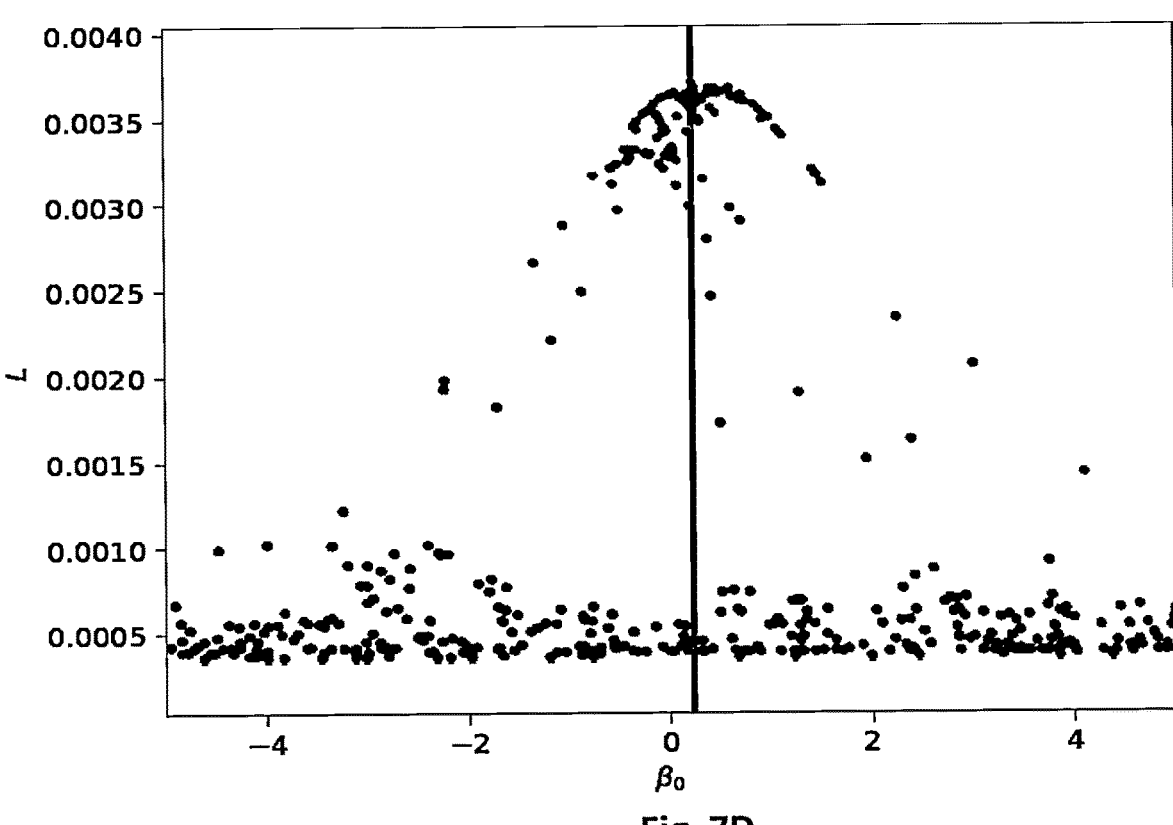
FIG. 7D is a detail of FIG. 7C.

FIG. 7C shows the value of the likelihood function L (Y axis) as a function of $\beta_0$ (X axis). FIG. 7D is a detail of FIG. 7B. The value of $\beta_0$ maximizing the likelihood function is equal to 0.3689 keV.

Figures 7E, 7F:
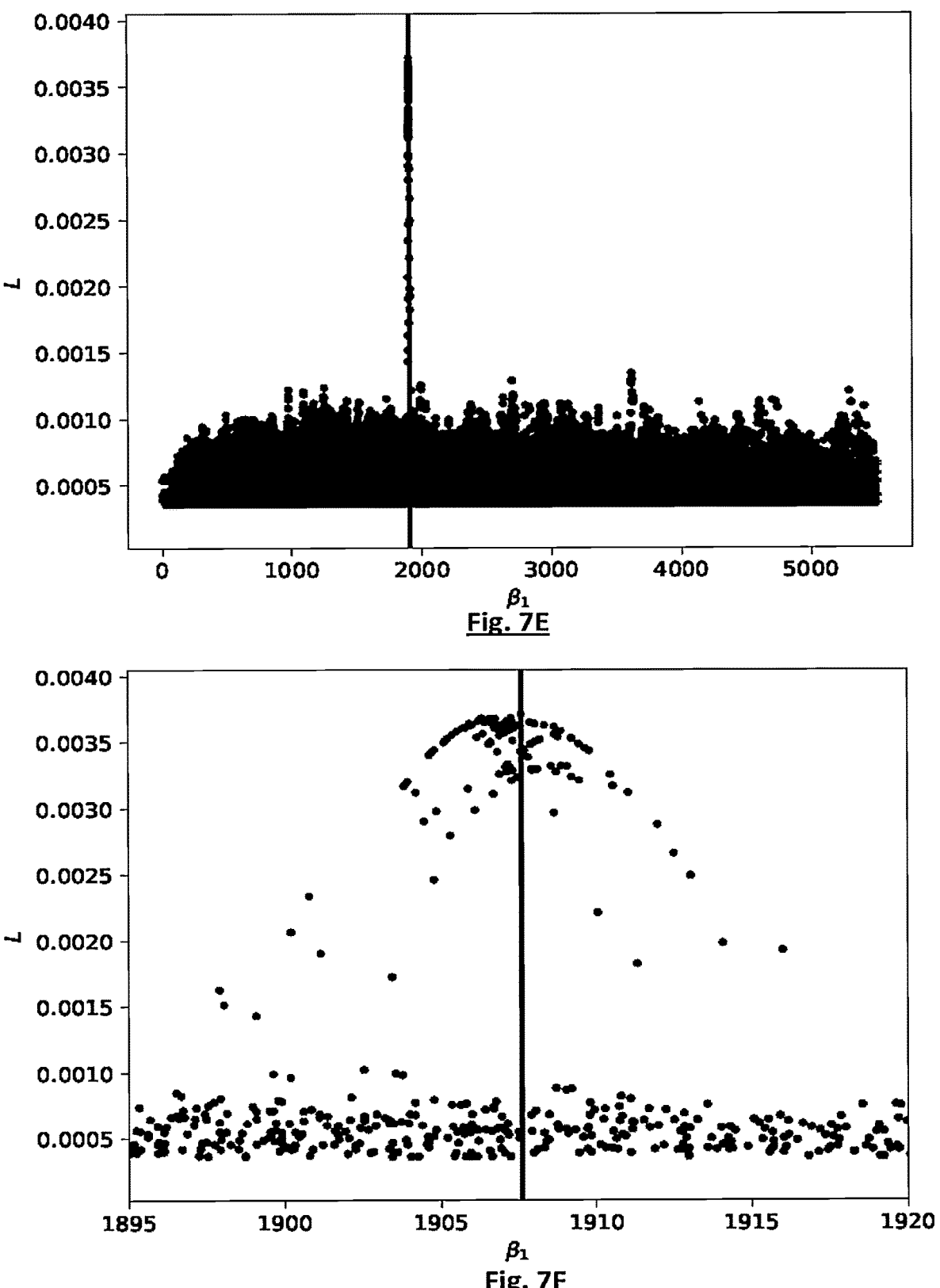
FIG. 7E shows the value of a likelihood function of another parameter of the calibration function for different values of said parameter.
FIG. 7F is a detail of FIG. 7E.

FIG. 7E shows the value of the likelihood function L (Y axis) as a function of $\beta_1$ (X axis). FIG. 7F is a detail of FIG. 7E. The value of $\beta_1$ maximizing the likelihood function is equal to 1907.2475 keV.

Figure 7G:
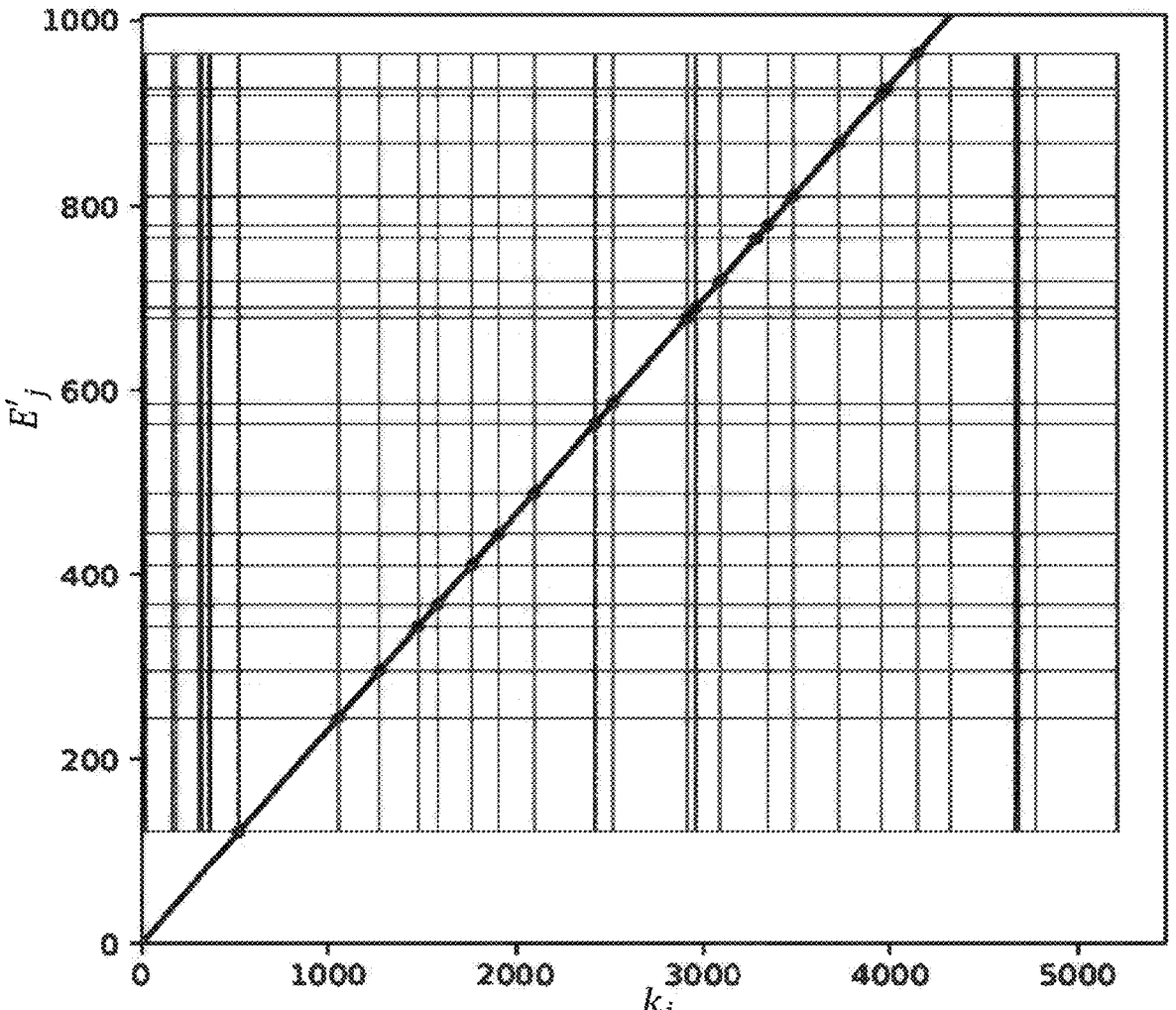
FIG. 7G illustrates correlations between channels assigned to detection peaks (X axis) of the spectrum represented in FIG. 7A and emission energies (Y axis).

FIG. 7G is a representation similar to FIG. 6 previously described. The X axis corresponds to the ranks of the channels of the detected peaks, and the associated uncertainty. The Y axis corresponds to the emission energies of $^{152}$Eu (keV). The application of the calibration function taking into account the optimal values $\beta_0$ and $\beta_1$ makes it possible to maximize the number of correlations between the channels of the detected peaks and the emission energies.

During a second series of tests, an energy calibration of the LaBr$_3$ detector was performed. Standard sources of $^{22}$Na, $^{57}$Co, $^{60}$Co et $^{133}$Ba were used. The predominant emission energies were 276.4 keV, 302.85 keV, 356.01 keV, 383.85 keV, 511 keV, 1173.23 keV, 1274.54 keV, 1332.49 keV. The spectrum was acquired according to 4096 channels. The calibration function was considered linear.

Figure 8A:
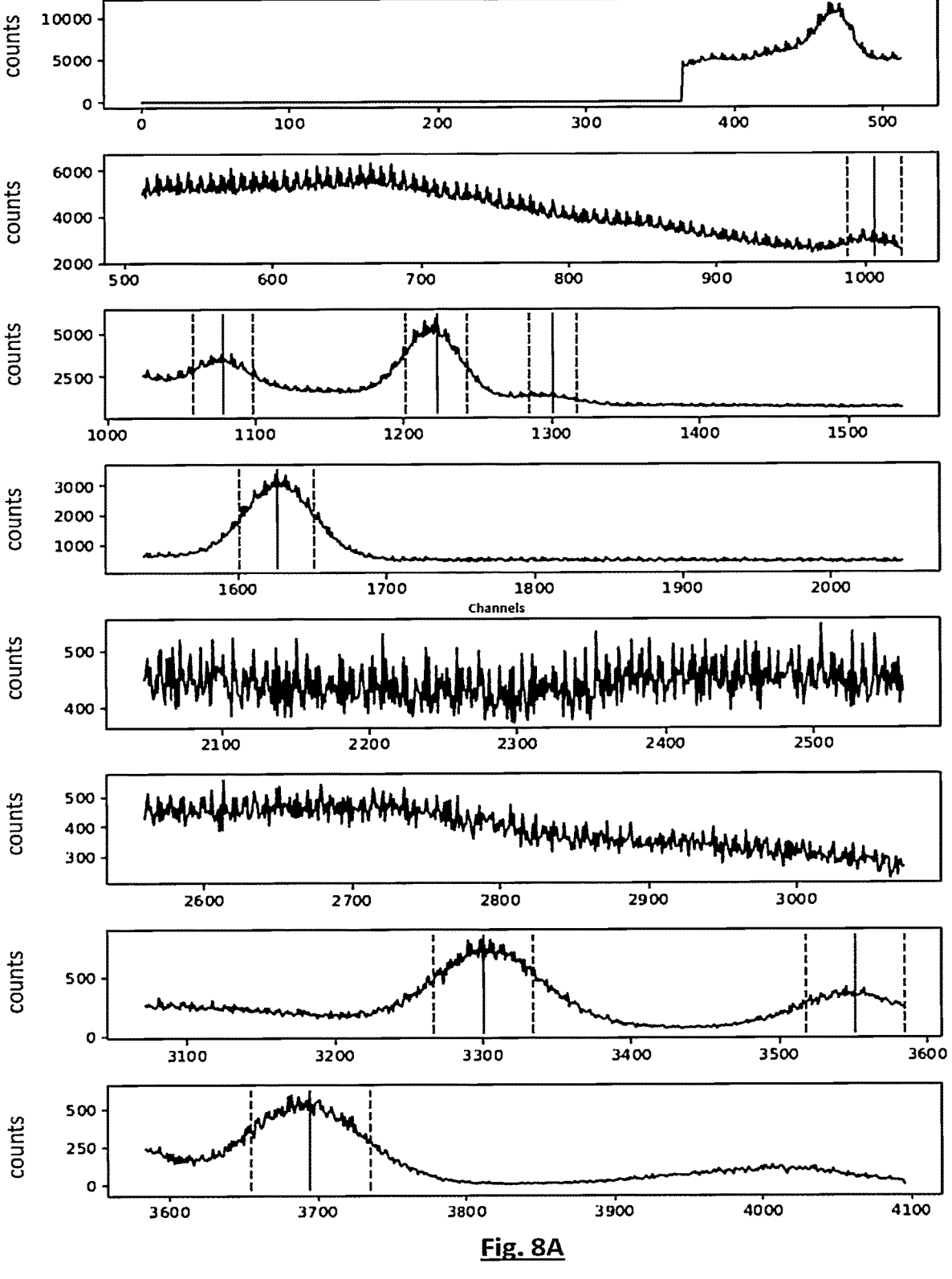
FIG. 8A shows a calibration spectrum acquired with an $LaBr_3$ (Lanthanum Bromide) detector. Also represented is the position of channels assigned to different peaks detected and a range of uncertainty relative to the position.

FIG. 8A represents the channels resulting from the peak detection algorithm. 8 peaks were detected, which corresponds to the number of energy emissions. The detection of the peaks made it possible to obtain 1568 points by taking into account the fact that the calibration function is increasing.

Figure 8B:
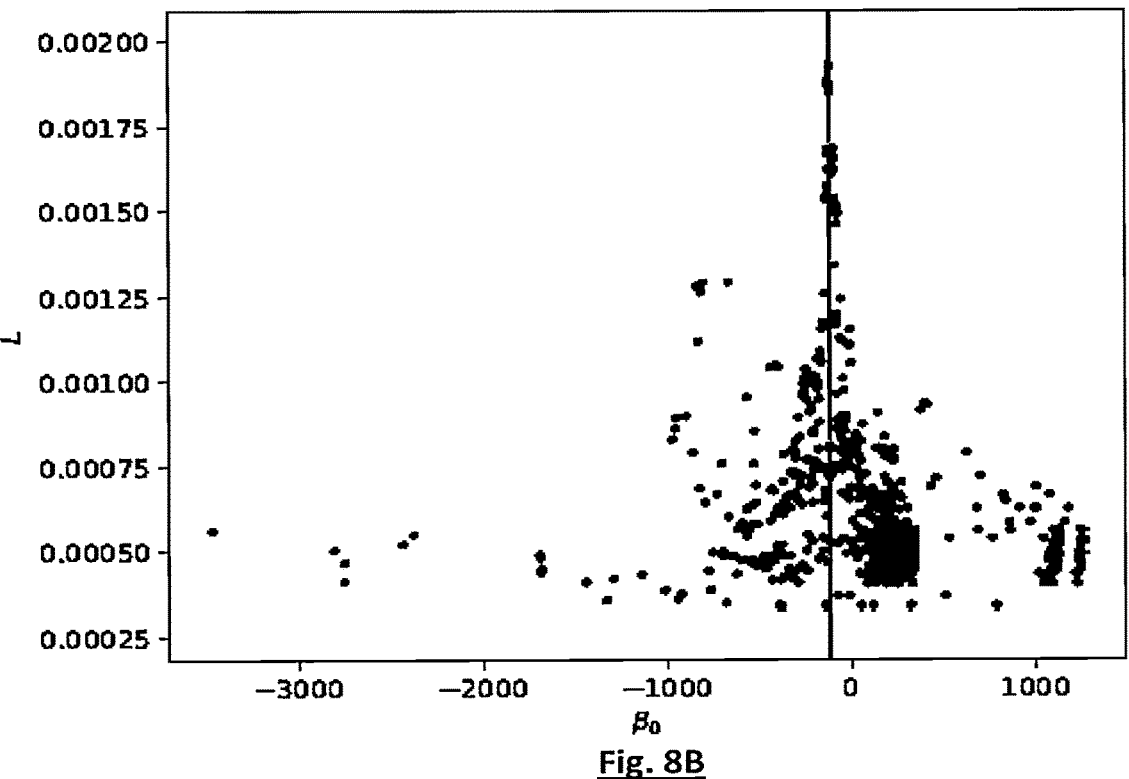
FIG. 8B shows the value of a likelihood function of a parameter of the calibration function for different values of said parameter.
Figure 8C:
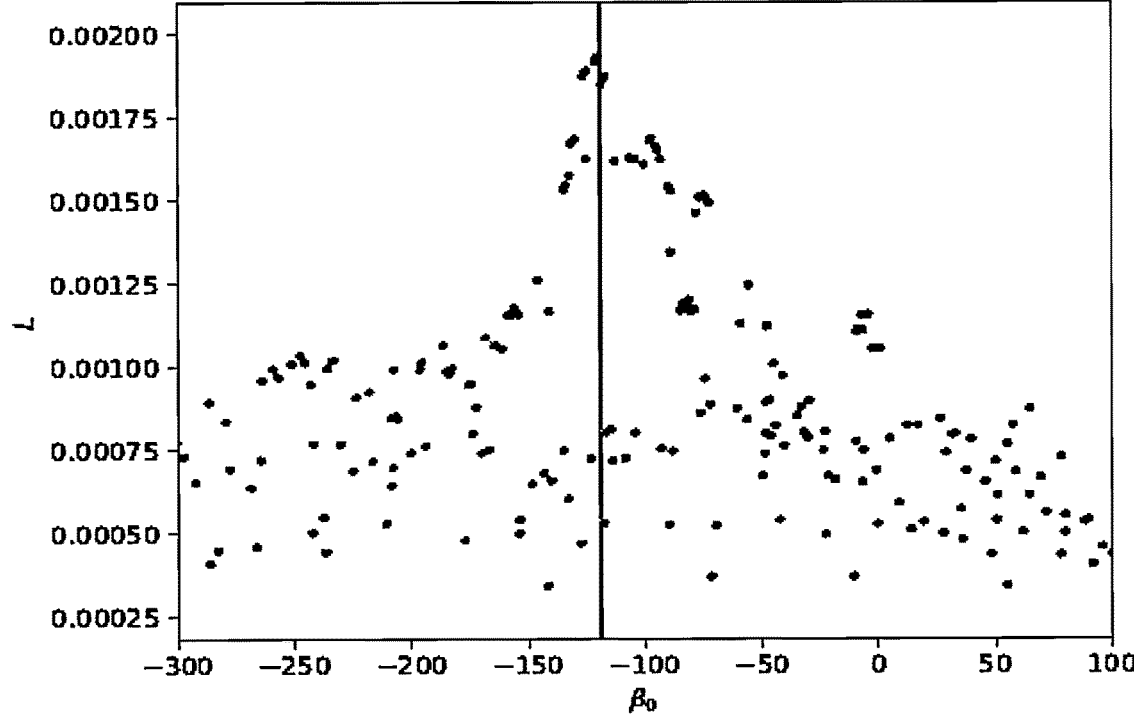
FIG. 8C is a detail of FIG. 8B.

FIG. 8B shows the value of the likelihood function L (Y axis) as a function of $\beta_0$ (X axis). FIG. 8C is a detail of FIG. 8B. The value of $\beta_0$ maximizing the likelihood function is equal to −120.7273 keV.

Figure 8D:
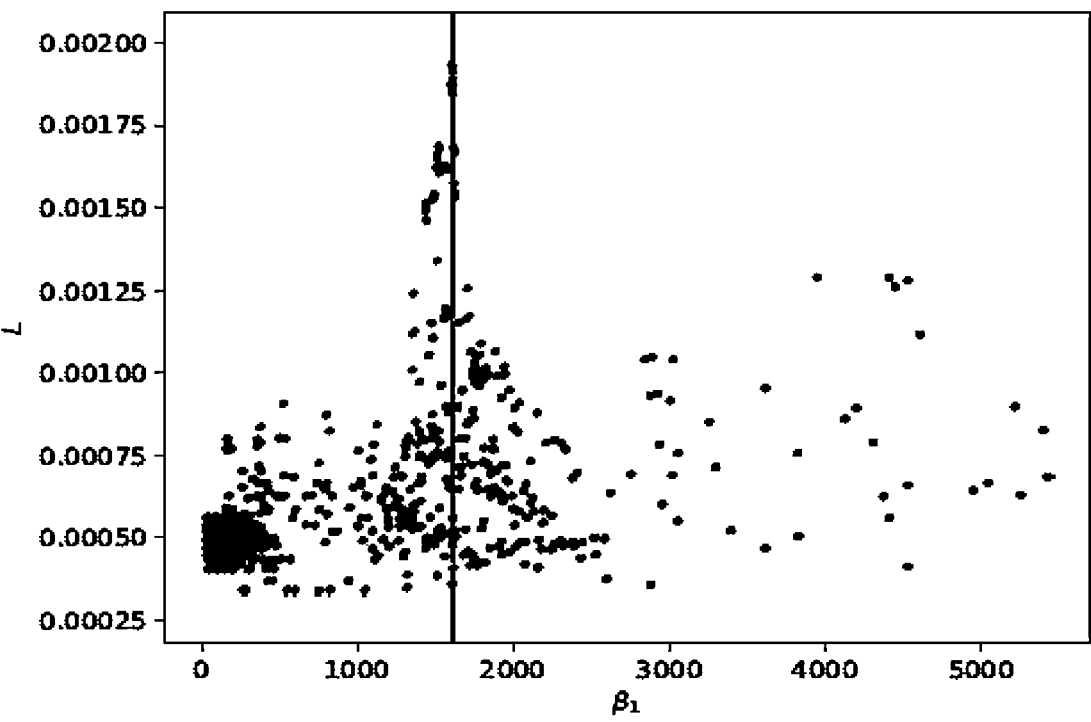
FIG. 8D shows the value of a likelihood function of another parameter of the calibration function for different values of said parameter.
Figure 8E:
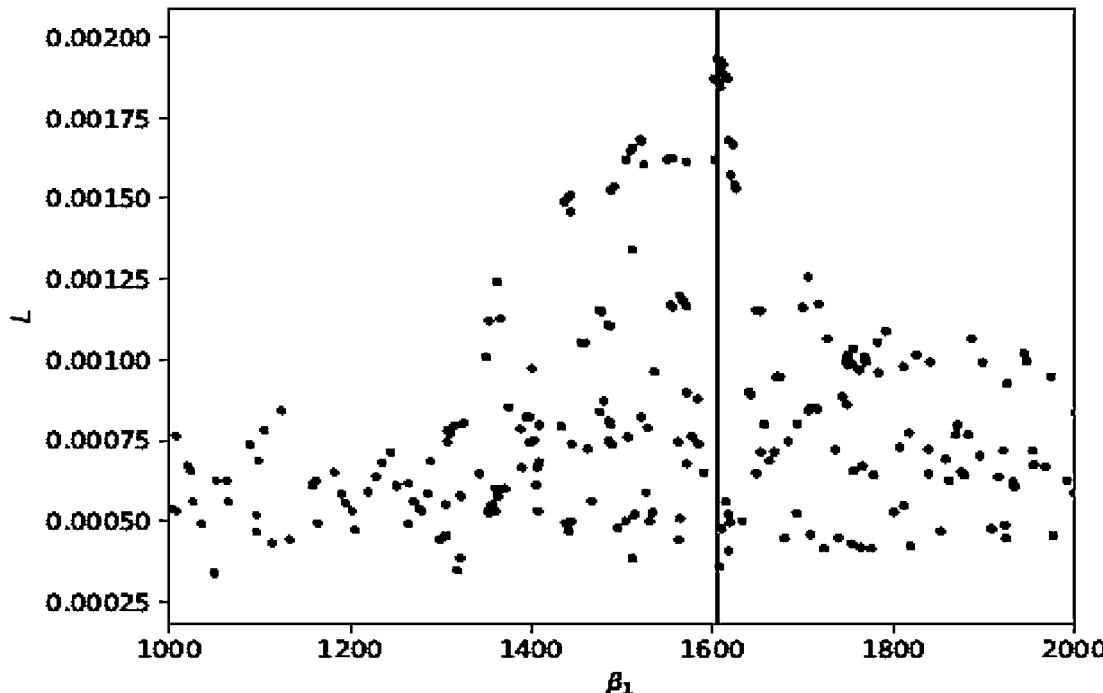
FIG. 8E is a detail of FIG. 8D.

FIG. 8D shows the value of the likelihood function L (Y axis) as a function of $\beta_1$ (X axis). FIG. 8E is a detail of FIG. 8D. The value of $\beta_1$ maximizing the likelihood function is equal to 1607.1911 keV.

Figure 8F:
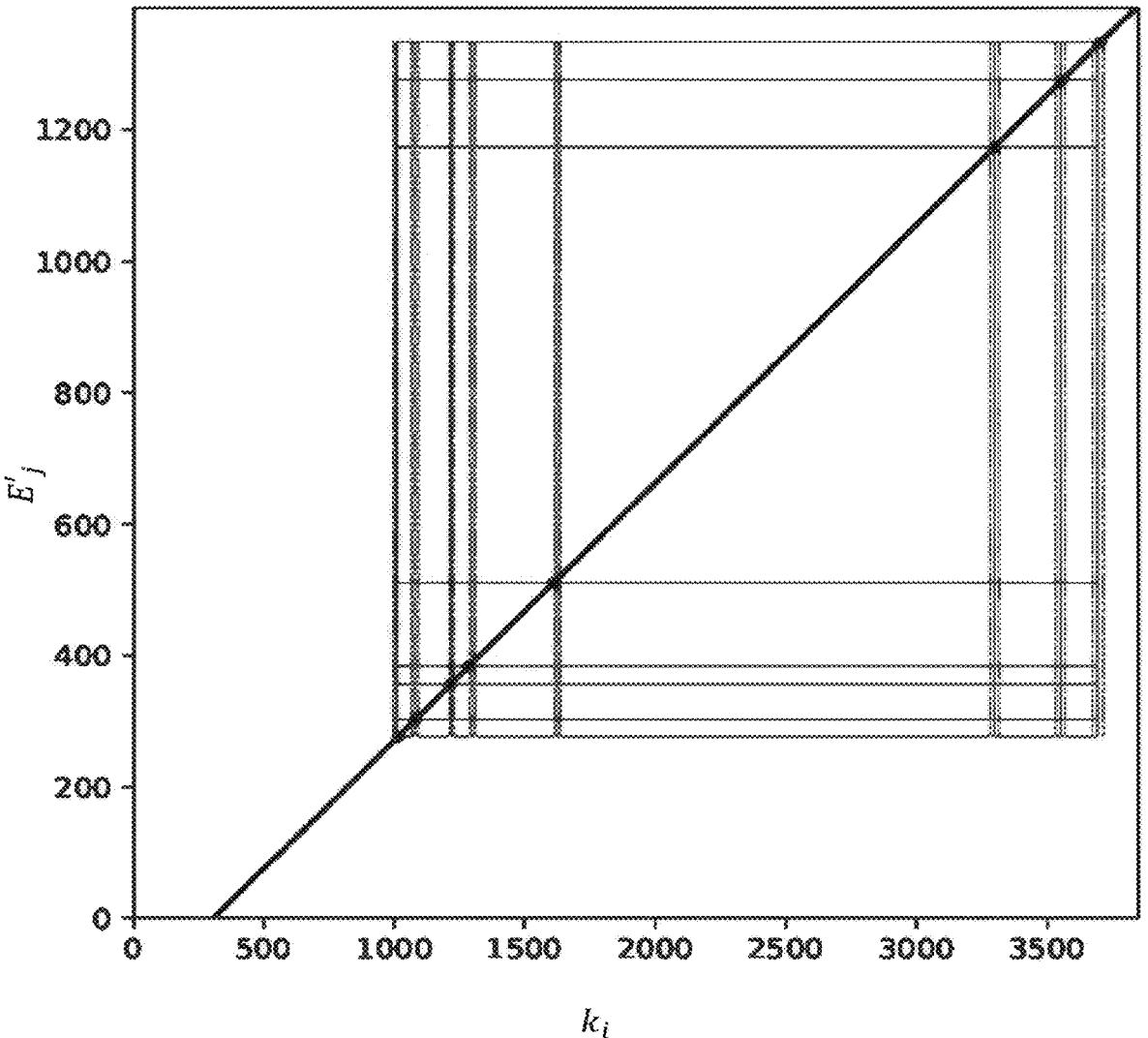
FIG. 8F illustrates correlations between channels assigned to detection peaks (X axis) of the spectrum represented in FIG. 8A and emission energies (Y axis).

FIG. 8F is similar to FIGS. 7F and 6 previously described. The X axis corresponds to the ranks of the channels of the detected peaks, and the associated uncertainty. The Y axis corresponds to the emission energies previously listed. The application of the calibration function taking into account the values $\beta_0$ and $\beta_1$ makes it possible to maximize the number of correlations between the channels of the detected peaks and the emission energies.

The calibration function can be different from a linear function. It can for example be a polynomial of a degree greater than or equal to 2.

The invention has been described in association with gamma spectrometry. It can be generalized to the spectrometry of radiations of other types of photons, or of other types of particles, in particular neutrons or charged particles. It can also be implemented in the detection of non-ionizing photons, for example photons of the infrared, visible or near ultraviolet spectral ranges.

It is understood that the invention can be applied to mass spectrometry. In this case, the spectrometric detector is configured to form pulses whose amplitude depends on the mass of particles having interacted in the detector. The establishment of the calibration function is performed by exposing the detector to a calibration object, comprising particles of different mass, the latter being known. The calibration function makes it possible to make a bijective link between the amplitude of each pulse and the mass of the particles detected by the detector.

The invention claimed is:

1. A method for processing a calibration spectrum formed by a spectrometric measurement device, the device comprising:

a detector configured to detect particles and to form, on each detection, a pulse whose amplitude depends on an energy of a particle having interacted in the detector; and a spectrometric measurement circuit configured to form a spectrum, the spectrum corresponding to a number of particles detected in channels, each channel being assigned a rank, a pulse amplitude corresponding to each rank, the method comprising:

a) arranging the device facing a calibration object, the calibration object emitting, to the detector, particles of different known emission energies;

b) detecting part of the particles by the detector and forming a calibration spectrum of the detected particles, the calibration spectrum comprising different peaks, each peak corresponding to one of the known emission energies;

c) detecting some of the peaks of the calibration spectrum and assigning a channel rank to each detected peak;

d) from the channel ranks assigned to different peaks in c) and the known emission energies, determining a calibration function, the calibration function determining an energy from the rank of each channel, the calibration function being a bijective function;

wherein d) comprises:

d-i) forming an analytical model of the calibration function, the analytical model being parameterized by a set of parameters;

d-ii) for different values of each parameter of the set of parameters:

applying the calibration function to the rank of each channel assigned to each detected peak, so as to obtain, for each rank, an energy determined by the calibration function, or applying a reciprocal function that is a reciprocal of the calibration function to each emission energy, so as to obtain, for each emission energy, a channel determined by the reciprocal function; and d-iii) determining the value of each parameter for which:

the energies determined in d-ii) are closest to the emission energies of the calibration object, or the channels determined in d-ii) are closest to the channels assigned to each detected peak.

2. The method of claim 1, wherein d-iii) comprises:

calculating a likelihood function of the value of each parameter of the set of parameters; and estimating the value of each parameter maximizing the likelihood function.

3. The method of claim 2, wherein c) comprises determining a width of each peak; and the likelihood function is defined with the width of each peak.

4. The method of claim 2, wherein d-iii) comprises:

forming different pairings, each pairing comprising an emission energy and a channel assigned to a peak, following c);

determining the value of each parameter of the set of parameters for which the calibration function links several pairings, each determined value forming an initial value of each parameter; and for each initial value, defining a search area extending around the initial value of each parameter, such that the value of each parameter maximizing the likelihood function is estimated in the search areas defined around initial values of the parameter.

5. The method of claim 2, wherein d-iii) is implemented using an optimization algorithm.

6. The method of claim 1, wherein c) comprises selecting the peaks of the calibration spectrum based on a criterion of selection of the peak.

7. The method of claim 6, wherein the selection criterion is a number of photons detected in each peak or a signal-to-noise ratio determined for each peak.

8. The method of claim 1, wherein d-iii) comprises using an a priori regarding the value of at least one parameter to determine the value of the at least one parameter.

9. The method of claim 1, wherein the particles are chosen from among photons, neutrons, or charged particles.

10. A device configured to acquire a spectrum of particles emitted by an object, the device comprising:

a detector configured to detect particles and to form, on each detection, a pulse whose amplitude depends on an energy released by the particle having interacted in the detector;

a spectrometric measurement circuit configured to form a spectrum, the spectrum corresponding to a distribution of the amplitudes of the pulses detected by the detector;

a processing unit, programmed to implement d) of the method of claim 1 from the spectrum.

11. A non-transitory medium, configured to be connected to a computer, comprising instructions when executed by the computer perform d) of the method of claim 1 from a spectrum representative of the energy of detected particles.

\* \* \* \* \*